United States Patent [19]

Clark

[11] 4,399,204

[45] Aug. 16, 1983

[54] SOLID CATHODE COMPRISING A LEAD FLUORIDE/TIN FLUORIDE COMPOUND

[75] Inventor: Milton B. Clark, Brecksville, Ohio

[73] Assignee: Union Carbide Corporation, Danbury, Conn.

[21] Appl. No.: 278,966

[22] Filed: Jun. 30, 1981

[51] Int. Cl.$^3$ .................. H01M 6/14; H01M 4/58; H01M 4/56
[52] U.S. Cl. .................. 429/197; 429/218; 429/225
[58] Field of Search ............. 429/199, 197, 221, 218, 429/225, 226; 252/182.1

[56] References Cited

U.S. PATENT DOCUMENTS

| 219,875 | 12/1880 | Mellors | 15/257.2 |
|---|---|---|---|
| 3,989,543 | 11/1976 | Krasnow | 429/194 |
| 4,302,520 | 11/1981 | Evans et al. | 429/221 |

FOREIGN PATENT DOCUMENTS 2330127  5/1977  France .
52-53219 10/1977  Japan .

OTHER PUBLICATIONS

Reau et al., Mat. Res. Bull., vol. 13, pp. 877–882, 1978.
Pannetier et al., Mat. Res. Bull., vol. 14, pp. 627–631, 1979.
Journal of Solid State Chemistry 29, 373–377 (1979), "Fast Ionic Conduction of Fluorides with the Fluorite-Type Structure", C. Lucat et al.
U.S. patent application Ser. No. 219,875, filed 12/80 by G. W. Mellors.

Primary Examiner—Donald L. Walton
Assistant Examiner—Stephen J. Kalafut
Attorney, Agent, or Firm—Cornelius F. O'Brien

[57] ABSTRACT

A nonaqueous cell employing a solid cathode compound of lead fluoride and tin fluoride such as $PbSnF_4$.

6 Claims, 8 Drawing Figures

SOLID CATHODE COMPRISING A LEAD FLUORIDE/TIN FLUORIDE COMPOUND

FIELD OF THE INVENTION

The invention relates to a nonaqueous cell utilizing a highly active metal anode such as lithium, a liquid organic electrolyte such as 3-methyl-2-oxazolidone in conjunction with a cosolvent and a selected solute, and a novel solid cathode compound of lead fluoride and tin fluoride having a mole ratio of from 4:1 to 1:4 such as PbSnF$_4$.

BACKGROUND OF THE INVENTION

The development of high energy battery systems requires the compatibility of an electrolyte possessing desirable electrochemical properties with highly reactive anode materials, such as lithium, sodium, and the like, and the efficient use of high energy density cathode materials. The use of aqueous electrolytes is precluded in these systems since the anode materials are sufficiently active to react with water chemically. It has, therefore, been necessary in order to realize the high energy density obtainable through use of these highly reactive anodes and high energy density cathodes to turn to the investigation of nonaqueous electrolyte systems and more particularly to nonaqueous organic electrolyte systems. A large number of nonaqueous organic electrolyte solutions is taught in the art which can be used for many battery systems.

Although a large number of known solid cathode materials is suitable for nonaqueous cell systems, there is always a need for new solid cathode materials to help fill the demand created by the large number of battery-powered devices being marketed. For example, the toy industry has recently embarked upon a program of marketing a multiplicity of computerized games some of which are educational in nature. Many of these devices require portable power sources and, therefore, any new cell system would be welcomed.

It is an object of the present invention to provide a new nonaqueous cell system employing a new solid cathode material of PbSnF$_4$ having an ionic conductivity of $10^{-3}$ohm$^{-1}$cm$^{-1}$.

It is another object of the present invention to provide a new nonaqueous cell system employing an active metal anode, an organic electrolyte based on 3-methyl-2-oxazolidone and an active solid cathode compound comprising lead fluoride and tin fluoride having a mole ratio of from 4:1 to 1:4, particularly 1:1 producing PbSnF$_4$.

SUMMARY OF THE INVENTION

The invention is directed to a nonaqueous cell comprising an active metal anode, an organic electrolyte solution and a solid cathode material comprising a compound of lead fluoride and tin fluoride having a mole ratio between 4:1 to 1:4.

As used herein, the solid cathode material of this invention in addition to containing a compound of lead fluoride/tin fluoride may also contain the simple compounds of lead fluoride and/or tin fluoride.

Preferable solid cathodes of this invention would be PbSnF$_4$ (PbF$_2$:SnF$_2$), Pb$_2$SnF$_6$ (2PbF$_2$:SnF$_2$), Pb$_4$SnF$_{10}$ (4PbF$_2$:SnF$_2$), PbSn$_4$F$_{10}$ (PbF$_2$:4SnF$_2$) and PbSn$_2$F$_6$ (PbF$_2$:2SnF$_2$) with PbSnF$_4$ being the most preferable.

The lead fluoride/tin fluoride compounds of this invention can be prepared by thermally heating the materials to a temperature of between about 600° F. and about 625° F. or they could be precipitated in a conventional manner. A disclosure of the preparation of some of these materials is contained in an article by J. Pannetier, G. Denes and J. Lucas appearing in the Material Research Bulletin, Vol. 14, pages 627 to 631 (1979), said article being incorporated herein by reference. An article titled Fast Ionic Conduction Of Fluorides With The Fluoride-Type Structure by C. Lucat et al appearing in The Journal of Solid State Chemistry 29, pages 373–377 (1979) discloses some of the characteristics of PbSnF$_4$. This article is also incorporated herein by reference. A phase diagram of some of the compounds of this invention is disclosed in an article by J. D. Donaldson and B. J. Senior appearing in the J. Chem. Soc. (A) 1967, pages 1821 to 1825, said article being incorporated herein by reference.

The solid cathode materials of lead fluoride and tin fluoride in the range recited above have been found to be ideally suited for use in nonaqueous cell systems.

If desired, other components may be added to the cathode material such as binders, conductive agents, and the like. Suitable binders would be polytetrafluoroethylene, polyethylene, polysulfone, polypropylene and polyamide, and conductive agents would be a carbonaceous material such as carbon or graphite and metal powders.

Useful highly active metal anode materials include aluminum, the alkali metals, alkaline earth metals and alloys of alkali metals or alkaline earth metals with each other and other metals. The term "alloy" as used herein and in the appended claims is intended to include mixtures, solid solutions, such as lithium-magnesium, and intermetallic compounds, such as lithium monoaluminide. The preferred anode materials are lithium, sodium, potassium, calcium and alloys thereof.

Useful organic solvents employed alone or mixed with one or more other solvents for use in this invention include the following classes of compounds:

Alkylene nitriles: e.g., crotonitrile (liquid range −51.1° C. to 120° C.)

Trialkyl borates: e.g., trimethyl borate, (CH$_3$O)$_3$B (liquid range −29.3° to 67° C.)

Tetraalkyl silicates: e.g., tetramethyl silicate, (CH$_3$O)$_4$Si (boiling point 121° C.)

Nitroalkanes: e.g., nitromethane, CH$_3$NO$_2$ (liquid range −17° to 100.8° C.)

Alkylnitriles: e.g., acetonitrile, CH$_3$CN (liquid range −45° to 81.6° C.)

Dialkylamides: e.g., dimethylformamide, HCON(CH$_3$)$_2$ (liquid range −60.48° to 149° C.)

Lactams: e.g., N-methylpyrrolidone,

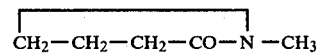

(liquid range −16° to 202° C.)

Tetraalkylureas: e.g., tetramethylurea, (CH$_3$)$_2$N—CO—N(CH$_3$)$_2$ (liquid range −1.2° to 166° C.)

Monocarboxylic acid esters: e.g., ethyl acetate (liquid range −83.6° to 77.06° C.)

Orthoesters: e.g., trimethylorthoformate, HC(OCH$_3$)$_3$ (boiling point 103° C.)

Lactones: e.g., γ-(gamma)butyrolactone,

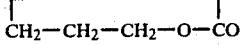

(liquid range −42° to 206° C.)
Dialkyl carbonates: e.g., dimethyl carbonate, OC-(OCH₃)₂ (liquid range 2° to 90° C.)
Alkylene carbonates: e.g., propylene carbonate,

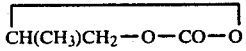

(liquid range −48° to 242° C.)
Monoethers: e.g., diethyl ether (liquid range −116° to 34.5° C.)
Polyethers: e.g., 1,1- and 1,2-dimethoxyethane (liquid ranges −113.2° to 64.5° C. and −58° to 83° C., respectively)
Cyclic ethers: e.g., tetrahydrofuran (liquid range −65° to 67° C.); 1,3-dioxolane (liquid range −95° to 78° C.)
Nitroaromatics: e.g., nitrobenzene (liquid range 5.7° to 210.8° C.)
Aromatic carboxylic acid halides: e.g., benzoyl chloride (liquid range 0° to 197° C.); benzoyl bromide (liquid range −24° to 218° C.)
Aromatic sulfonic acid halides: e.g., benzene sulfonyl chloride (liquid range 14.5° to 251° C.)
Aromatic phosphonic acid dihalides: e.g., benzene phosphonyl dichloride (boiling point 258° C.)
Aromatic thiophosphonic acid dihalides: e.g., benzene thiophosphonyl dichloride (boiling point 124° C. at 5 mm.)
Cyclic sulfones: e.g., sulfolane,

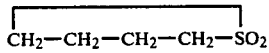

(melting point 22° C.); 3-methylsulfolane (melting point −1° C.)
Alkyl sulfonic acid halides: e.g., methanesulfonyl chloride (boiling point 161° C.)
Alkyl carboxylic acid halides: e.g., acetyl chloride (liquid range −112° to 50.9° C.); acetyl bromide (liquid range −96° to 76.° C.); propionyl chloride (liquid range −94° to 80° C.)
Saturated heterocyclics: e.g., tetrahydrothiophene (liquid range −96° to 121° C.); 3-methyl-2-oxazolidone (melting point 15.9° C.)
Dialkyl sulfamic acid halides: e.g., dimethyl sulfamyl chloride (boiling point 80° C. at 16 mm.)
Alkyl halosulfonates: e.g., ethyl chlorosulfonate (boiling point 151° C.)
Unsaturated heterocyclic carboxylic acid halides: e.g., 2-furoyl chloride (liquid range −2° to 173° C.)
Five-membered unsaturated heterocyclics: e.g., 3,5-dimethylisoxazole (boiling point 140° C.); 1-methylpyrrole (boiling point 114° C.); 2,4-dimethylthiazole (boiling point 144° C.); furan (liquid range −85.65° to 31.36° C.)
Esters and/or halides of dibasic carboxylic acids: e.g., ethyl oxalyl chloride (boiling point 135° C.)
Mixed alkyl sulfonic acid halides and carboxylic acid halides: e.g., chlorosulfonyl acetyl chloride (boiling point 98° C. at 10 mm.)
Dialkyl sulfoxides: e.g., dimethyl sulfoxide (liquid range 18.4° to 189° C.)
Dialkyl sulfates: e.g., dimethylsulfate (liquid range −31.75° to 188.5° C.)
Dialkyl sulfites: e.g., dimethylsulfite (boiling point 126° C.)
Alkylene sulfites: e.g., ethylene glycol sulfite (liquid range −11° to 173° C.)
Halogenated alkanes: e.g., methylene chloride (liquid range −95° to 40° C.); 1,3-dichloropropane (liquid range −99.5° to 120.4° C.)

Of the above, the preferred solvents are sulfolane; crotonitrile; nitrobenzene; tetrahydrofuran; methyl-substituted tetrahydrofuran; 1,3-dioxolane; 3-methyl-2-oxazolidone; propylene carbonate; γ-butyrolactone; ethylene glycol sulfite; dimethylsulfite; dimethyl sulfoxide; and 1,1- and 1,2-dimethoxyethane. Of the preferred solvents, the best are sulfolane; 3-methyl-2-oxazolidone; propylene carbonate 1,1- and 1,2-dimethoxyethane, and 1,3-dioxolane because they appear more chemically inert to battery components and have wide liquid ranges, and especially because they permit highly efficient utilization of the cathode materials.

The best electrolyte for use in this invention is a 3-methyl-2-oxazolidone-based electrolyte. Liquid organic 3-methyl-2-oxazolidone material, (3Me2Ox)

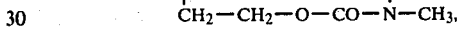

is an excellent nonaqueous solvent because of its high dielectric constant, chemical inertness to battery components, wide liquid range and low toxicity.

However, it has been found that when metal salts are dissolved in liquid 3Me2Ox for the purpose of improving the conductivity of 3Me2Ox, the viscosity of the solution may be too high for its efficient use as an electrolyte for some nonaqueous cell applications other than those requiring very low current drains. Thus, in some applications in accordance with this invention, the addition of a low viscosity cosolvent would be desirable if 3Me2Ox is to be used as an electrolyte for nonaqueous cells which can operate or perform at a high energy density level.

The low viscosity cosolvents which can be used along with 3Me2Ox include tetrahydrofuran (THF), methyl-substituted tetrahydrofuran (Met-THF) dioxolane (DIOX), dimethoxyethane (DME), dimethyl isoxazole (DMI), diethyl carbonate (DEC), ethylene glycol sulfite (EGS), dioxane, dimethyl sulfite (DMS) or the like. Dimethoxyethane (DME), dioxolane (DIOX) are preferred cosolvents because of their compatibility with metal salts dissolved in liquid 3Me2Ox and their chemical inertness to cell components. Specifically, the total amount of the low viscosity cosolvent added could be between about 20% and about 80% based on total solvent volume, i.e., exclusive of solute, so as to lower the viscosity to a level suitable for use in a high drain cell.

The ionizing solute for use in the invention may be simple or double salt or mixtures thereof, for example, LiCF₃SO₃, LiBF₄ and LiClO₄ which will produce an ionically conductive solution when dissolved in one or more solvents. Preferred solutes are complexes of inorganic or organic Lewis acids and inorganic ionizable salts. The only requirements for utility are that the salts, whether simple or complex, be compatible with the solvent or solvents being employed and that they yield a solution which is sufficiently ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226—July/December 1938, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the double salt or the resulting ions in situ. One such double salt, for example, is that formed by the combination of aluminum chloride and lithium chloride to yield lithium aluminum tetrachloride.

EXAMPLE 1

Figure 1:
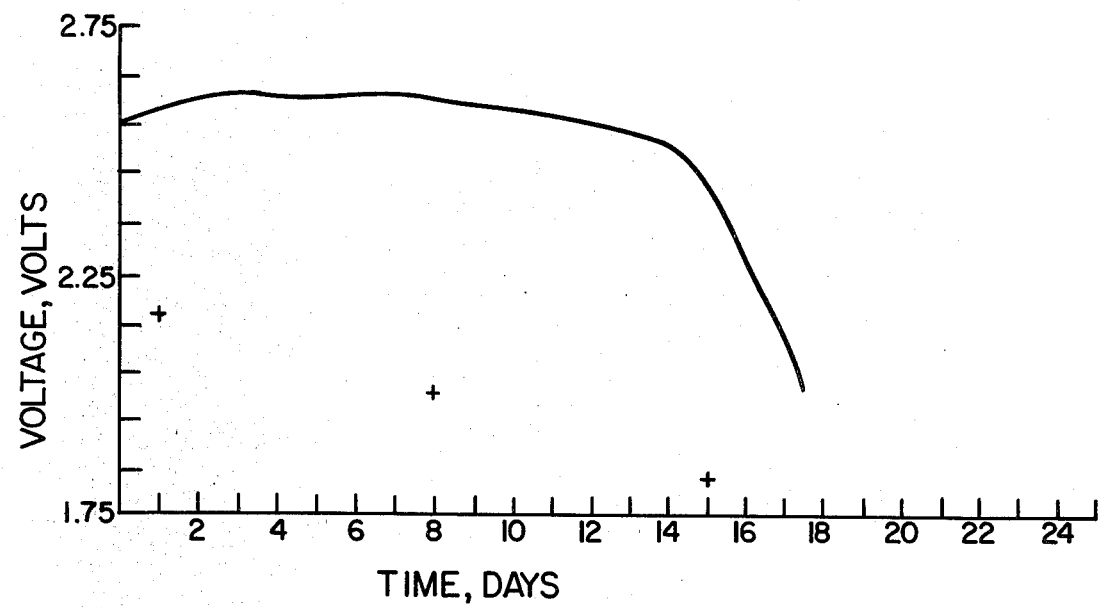
FIG. 1 contains data showing the discharge characteristics of the cell disclosed and described in Example 1.
Figure 2:
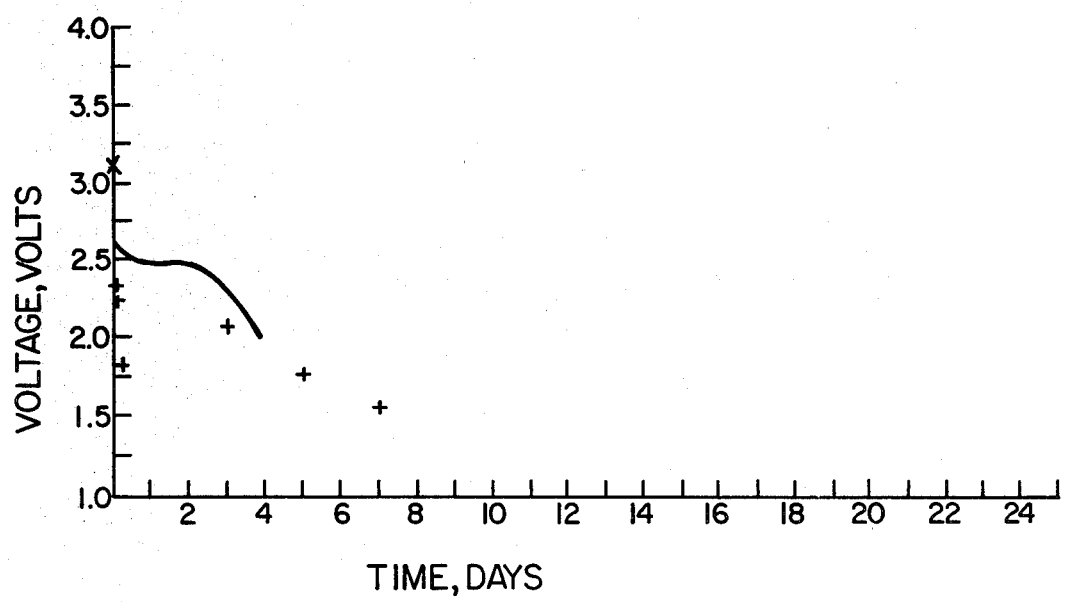
FIGS. 2 through 8 contain data showing the discharge characteristics of the cell samples A through G, respectively, disclosed and described in Example 2.
Figure 3:
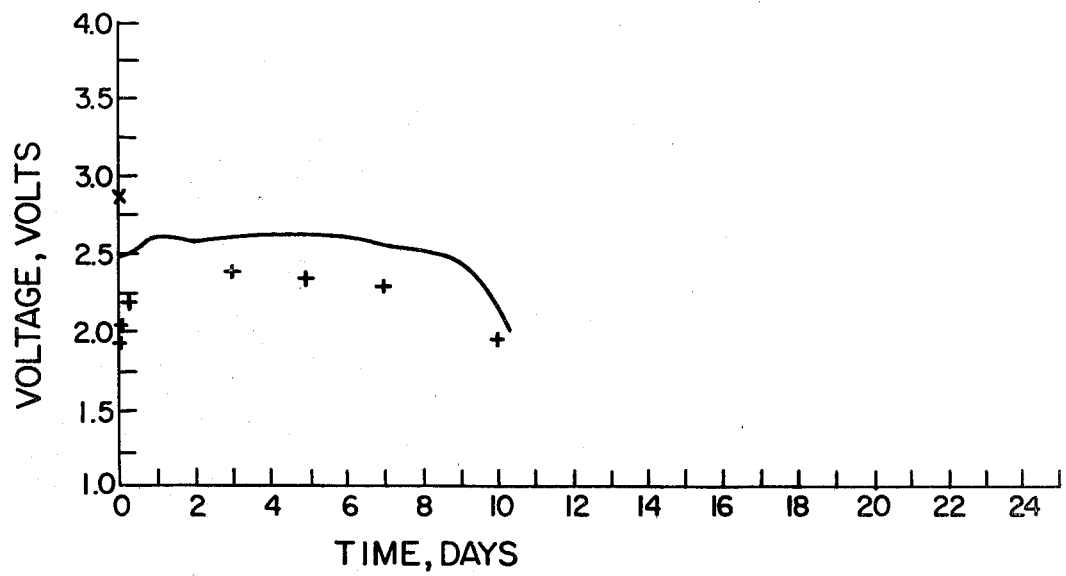
Figure 4:
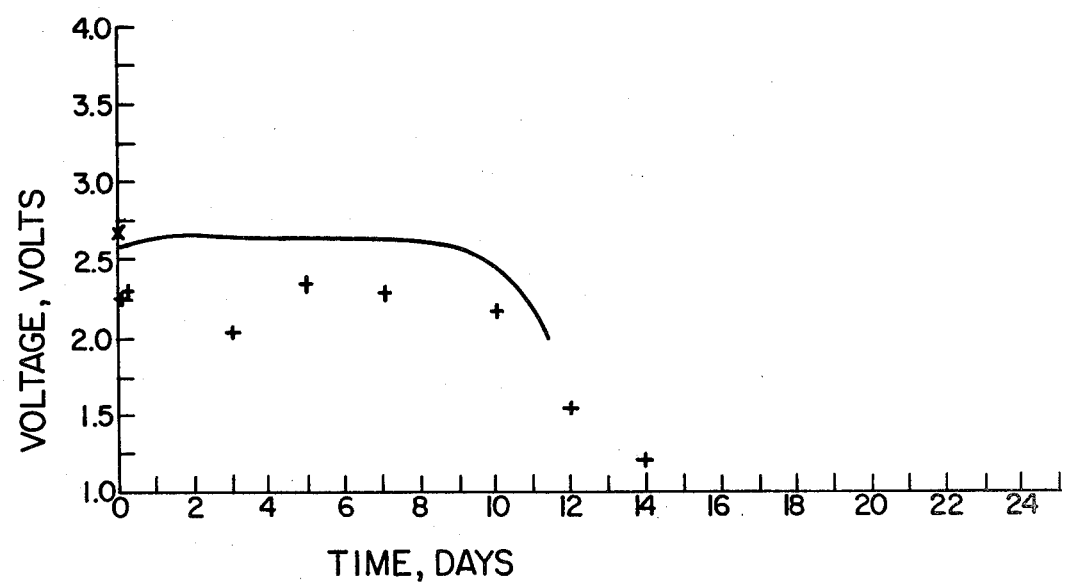
Figure 5:
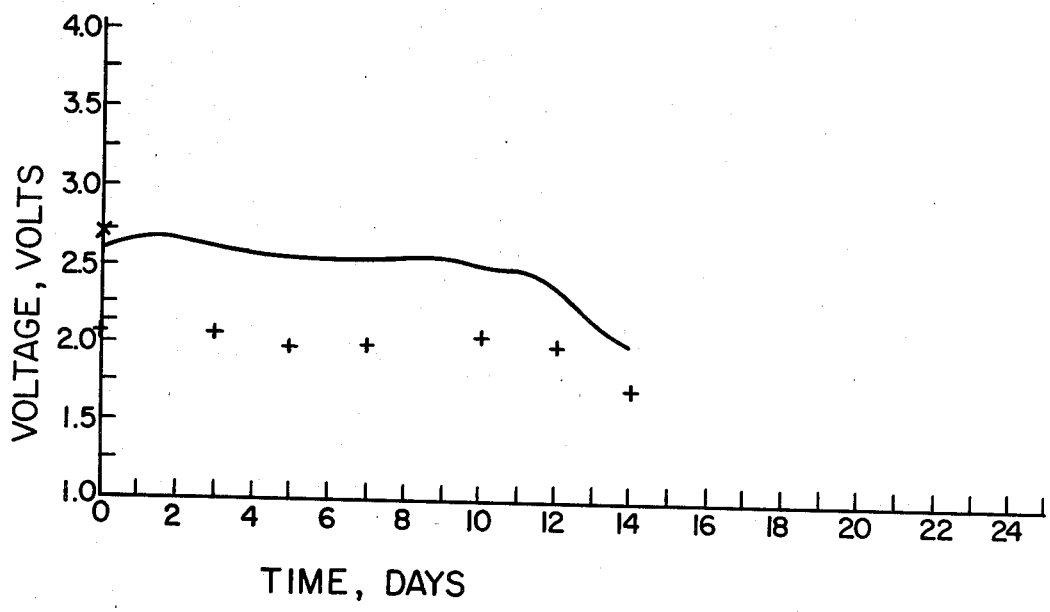
Figure 6:
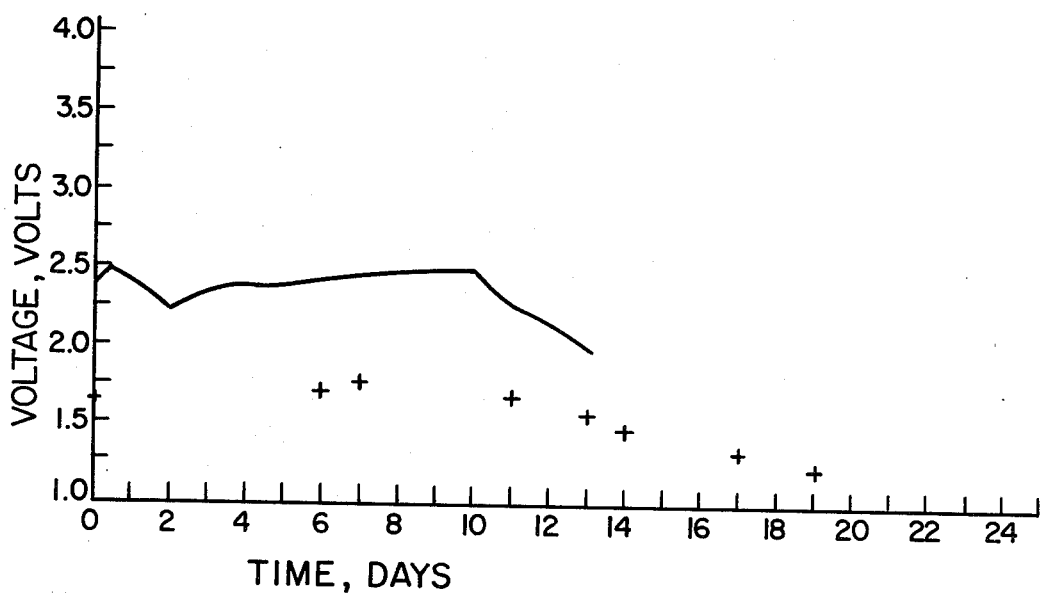
Figure 7:
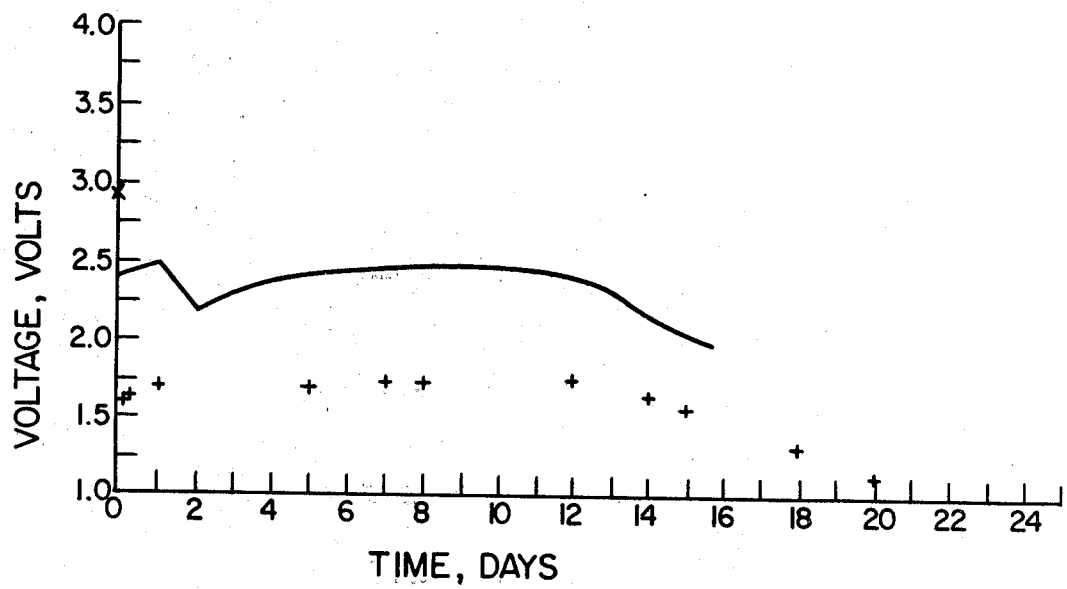
Figure 8:
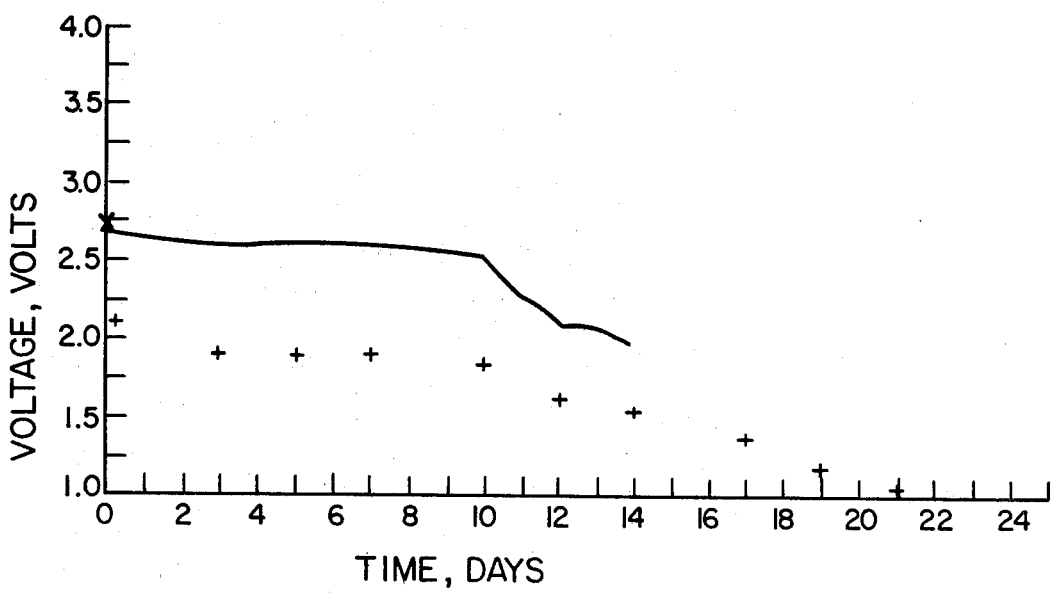

A flat-type cell was constructed utilizing a stainless steel base having therein a shallow depression into which the cell contents were placed and over which a stainless steel cap was placed to close the cell. The contents of each sample cell consisted of two 0.375 inch diameter lithium discs (0.077 g) having a total thickness of 0.080 inch, about 1.5 ml of an electrolyte consisting of about 40 vol. % dioxolane, about 30 vol. %. dimethoxyethane (DME), about 30 vol. % 3Me2Ox plus about 0.1% dimethylisoxazole (DMI) and containing 1 M $LiCF_3SO_3$, a 0.875 inch diameter porous nonwoven polypropylene separator (0.01 inch thick) which absorbed some of the electrolyte and 0.47 gram of a cathode mix compressed (70% packing) within a stainless steel support ring to form a cathode. The cathode consisted of about 87% by weight $PbSnF_4$, 8% by weight acetylene black and 5% by weight of a Teflon emulsion containing 60% solids and obtained from the DuPont Corporation as DuPont 30B. The cell was discharged across a 15 K-ohm load and the voltage observed with time is shown as the curve in FIG. 1. In addition, at various time intervals, the cell was discharged across a 1 K-ohm load (pulse discharge) for two seconds and the voltage observed is shown at the points identified as "+" in FIG. 1.

EXAMPLE 2

Sample cells A and G were prepared as generally described in Example 1 except that a greater amount of lithium was used to further insure that the cells were cathode limited, the separator employed was a nonwoven glass fiber separator and the active cathode material used in each cell was as shown in the Table. In addition, the percent porosity and the calculated milliampere hours per gram of the active cathodes used in sample cells A through G are also shown in the Table. Each sample cell A through G was discharged across a 15 K-ohm load and the voltage observed for each cell with time is shown as the curve in FIGS. 2 through 8, respectively. In addition, at various time intervals, each sample cell A through G was discharged across a 1 K-ohm load (pulse discharge) for two seconds and the voltage observed for each cell is shown as the points identified as "+" in FIGS. 2 through 8, respectively. The electrochemical efficiency of the cathode of each cell was calculated and is shown in the Table along with the actual milliampere hour capacity of each cell.

TABLE

| Sample Cell | Composition | Weight of Active Cathode Material, gram | % Porosity | Exp.* mAh/gm | Actual mAh | % Util. (Efficiency) |
|---|---|---|---|---|---|---|
| A | $PbF_2$ | 0.21 | 43 | 70.5 | 14.8 | 32.2 |
| B | $SnF_2/PbF_2$ 20:80 | 0.36 | 46 | 117.4 | 41.9 | 49.8 |
| C | $SnF_2/PbF_2$ 33:67 | 0.33 | 39 | 141.8 | 47.0 | 56.5 |
| D | $SnF_2/PbF_2$ 50:50 | 0.31 | 43 | 183.0 | 56.1 | 68.7 |
| E | $SnF_2/PbF_2$ 67:33 | 0.31 | 36 | 162.1 | 49.6 | 55.7 |
| F | $SnF_2/PbF_2$ 80:20 | 0.30 | 34 | 201.7 | 59.3 | 65.6 |
| G | $SnF_2$ | 0.27 | 34 | 206.0 | 55.0 | 60.2 |

*Exp. = calculated based on discharge capacity obtained.

What is claimed is:

1. A nonaqueous cell comprising an active metal anode, an organic electrolyte solution, and a solid cathode material comprising a compound of lead fluoride and tin fluoride having a mole ratio between 4:1 to 1:4.

2. A nonaqueous cell comprising an active metal anode, an organic electrolyte solution, and a solid cathode material selected from the group consisting of $PbSnF_4$, $Pb_2SnF_6$, $Pb_4SnF_{10}$, $PbSn_4F_{10}$ and $PbSn_2F_6$.

3. A nonaqueous cell comprising an active metal anode, an organic electrolyte solution and a solid cathode material of $PbSnF_4$.

4. The nonaqueous cell of claim 1, 2 or 3 wherein at least one material selected from the group consisting of graphite, carbon, polytetrafluoroethylene, polyethylene, polysulfone, polypropylene and polyamide is added to the solid cathode material.

5. The nonaqueous cell of claim 4 wherein the anode is lithium and the solvent of the electrolyte solution is 3-methyl-2-oxazolidone along with a low viscosity solvent selected from the group consisting of tetrahydrofuran, methyl-substituted tetrahydrofuran, dioxolane, dimethoxyethane, dimethyl isoxazole, diethyl carbonate, ethylene glycol sulfite, dioxane and dimethyl sulfite.

6. The nonaqueous cell of claim 4 wherein the anode is lithium and the electrolyte solution comprises $LiCF_3SO_3$ dissolved in 3-methyl-2-oxazolidone, dimethoxyethane and dioxolane.

* * * * *